US012107471B2

(12) United States Patent
Lee

(10) Patent No.: US 12,107,471 B2
(45) Date of Patent: Oct. 1, 2024

(54) MOTOR INCLUDING A BUSBAR HAVING A PLURALITY OF TERMINALS

(71) Applicant: LG INNOTEK CO., LTD., Seoul (KR)

(72) Inventor: Seong Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 642 days.

(21) Appl. No.: 17/275,017

(22) PCT Filed: Sep. 11, 2019

(86) PCT No.: PCT/KR2019/011807
§ 371 (c)(1),
(2) Date: Mar. 10, 2021

(87) PCT Pub. No.: WO2020/055150
PCT Pub. Date: Mar. 19, 2020

(65) Prior Publication Data
US 2022/0069659 A1    Mar. 3, 2022

(30) Foreign Application Priority Data

Sep. 11, 2018    (KR) .................. 10-2018-0108451

(51) Int. Cl.
*H02K 3/52* (2006.01)
*B62D 5/04* (2006.01)

(52) U.S. Cl.
CPC ............... *H02K 3/522* (2013.01); *B62D 5/04* (2013.01); *H02K 2203/09* (2013.01)

(58) Field of Classification Search
CPC ....... H02K 3/522; H02K 2203/09; B62D 5/04
See application file for complete search history.

(56) References Cited

U.S. PATENT DOCUMENTS 9,000,629 B2 *  4/2015  Yokogawa ............. H02K 15/03
                                                310/43
2003/0201688 A1 * 10/2003 Yamamura ............. H02K 3/522
                                                310/71

(Continued)

FOREIGN PATENT DOCUMENTS

JP    2013-102596 A    5/2013
JP    2013-211945 A   10/2013

(Continued)

OTHER PUBLICATIONS

International Search Report dated Dec. 27, 2019 in International Application No. PCT/KR2019/011807.

(Continued)

*Primary Examiner* — Tulsidas C Patel
*Assistant Examiner* — Mohammed Ahmed Qureshi
(74) *Attorney, Agent, or Firm* — Saliwanchik, Lloyd & Eisenschenk

(57) ABSTRACT

The present invention may provide a motor including a stator including coils, a rotor disposed inside the stator, and a busbar disposed above the stator, wherein the stator includes a first unit stator core and a second unit stator core, the coils include a first unit coil and a second unit coil, the busbar includes a body and a plurality of terminals connected to the coils of the stator, the plurality of terminals include first terminals and second terminals, the first unit coil is wound around the first unit stator core, the second unit coil is wound around the second unit stator core, one end of the first unit coil and one end of the second unit coil are connected to the first terminals, and the other end of the first unit coil and the other end of the second unit coil are connected to the second terminals.

17 Claims, 18 Drawing Sheets

(56) References Cited

U.S. PATENT DOCUMENTS

| | | | | |
|---|---|---|---|---|
| 2007/0076354 A1* | 4/2007 | Kato | ................... | H02K 3/522 |
| | | | | 361/637 |
| 2010/0148615 A1* | 6/2010 | Sasaki | ................... | H02K 3/522 |
| | | | | 310/180 |
| 2014/0091655 A1* | 4/2014 | Kajita | ................... | H02K 5/225 |
| | | | | 310/71 |

FOREIGN PATENT DOCUMENTS

| | | |
|---|---|---|
| JP | 2014-236524 A | 12/2014 |
| JP | 2016-101035 A | 5/2016 |
| JP | 2017-70124 A | 4/2017 |
| KR | 10-2011-0069088 A | 6/2011 |
| WO | 2011/108735 A1 | 9/2011 |
| WO | 2018/151133 A1 | 8/2018 |

OTHER PUBLICATIONS

Supplementary European Search Report dated Oct. 18, 2021 in European Application No. 19858866.7.
Office Action dated Jun. 20, 2023 in Japanese Application No. 2021-537424.

* cited by examiner

MOTOR INCLUDING A BUSBAR HAVING A PLURALITY OF TERMINALS

CROSS-REFERENCE TO RELATED APPLICATIONS

This application is the U.S. national stage application of International Patent Application No. PCT/KR2019/011807, filed Sep. 11, 2019, which claims the benefit under 35 U.S.C. § 119 of Korean Application No. 10-2018-0108451, filed Sep. 11, 2018, the disclosures of each of which are incorporated herein by reference in their entirety.

TECHNICAL FIELD

The present invention relates to a motor.

BACKGROUND ART

Electronic power steering (EPS) systems secure turning stability and provide rapid restoring forces so that drivers can travel safely. Such an EPS system controls driving of a steering shaft of a vehicle by driving a motor using an electronic control unit (ECU) according to operation conditions detected by a vehicle speed sensor, a torque angle sensor, a torque sensor, and the like.

A motor includes a rotor and a stator. The stator may include stator cores and a coil. The coil is wound around the stator cores. In the case of series winding, winding work may be performed by winding one coil around the plurality of stator cores disposed to be spaced apart from each other at once. In this case, a connecting portion of the coil should pass over another stator core. In this case, an insulation problem of the coil may occur. In order to insulate the coil, the connecting portion may be inserted into an insulation tube, but there are problems in that assembly is difficult, and thus manufacturing automation is difficult.

Technical Problem

Electronic power steering (EPS) systems secure turning stability and provide rapid restoring forces so that drivers can travel safely. Such an EPS system controls driving of a steering shaft of a vehicle by driving a motor using an electronic control unit (ECU) according to operation conditions detected by a vehicle speed sensor, a torque angle sensor, a torque sensor, and the like.

A motor includes a rotor and a stator. The stator may include stator cores and a coil. The coil is wound around the stator cores. In the case of series winding, winding work may be performed by winding one coil around the plurality of stator cores disposed to be spaced apart from each other at once. In this case, a connecting portion of the coil should pass over another stator core. In this case, an insulation problem of the coil may occur. In order to insulate the coil, the connecting portion may be inserted into an insulation tube, but there are problems in that assembly is difficult, and thus manufacturing automation is difficult.

Technical Solution

One aspect of the present invention provides a motor including a stator including coils, a rotor disposed inside the stator, and a busbar disposed above the stator, wherein the stator includes a first unit stator core and a second unit stator core, the coils include a first unit coil and a second unit coil, the busbar includes a body and a plurality of terminals connected to the coils of the stator, the plurality of terminals include first terminals and second terminals, the first unit coil is wound around the first unit stator core, the second unit coil is wound around the second unit stator core, one end of the first unit coil and one end of the second unit coil are connected to the first terminals, and the other end of the first unit coil and the other end of the second unit coil are connected to the second terminals.

Two unit coils may be disposed between the first unit coil and the second unit coil.

The second terminals may include a neutral terminal and a plurality of phase terminals.

The other end of the first unit coil may be connected to the neutral terminal, and the other end of the second unit coil may be connected to one of the plurality of phase terminals.

The second terminals may include two groups each including the neutral terminal and the plurality of phase terminals, and the two groups may be electrically divided.

Another aspect of the present invention provides a motor including a stator including coils, a rotor disposed inside the stator, and a busbar disposed above the stator, wherein the busbar includes a body and a plurality of terminals connected to the coils, the coils include a first unit coil and a second unit coil, the plurality of terminals include first terminals and second terminals, the first terminals and the second terminals include overlap regions in a shaft direction, a thickness of the first terminal is smaller than a thickness of the second terminal in the overlap region, one end of the first unit coil and one end of the second unit coil are connected to the first terminals, and the other end of the first unit coil and the other end of the second unit coil are connected to the second terminals.

Still another aspect of the present invention provides a motor including a stator including coils, a rotor disposed inside the stator, and a busbar disposed above the stator, wherein the busbar includes a body and a plurality of terminals connected to the coils, the coils include a first unit coil and a second unit coil, the plurality of terminals include first connecting terminals and second connecting terminals, the first connecting terminals include bent regions which overlap the second connecting terminals in a shaft direction, and one end of the first unit coil and one end of the second unit coil are connected to the first connecting terminals.

The first terminals may include first bodies having curvatures and first supports extending from one portions of the first bodies in a radial direction, and at least any one of the first body and the first supports may overlap the second terminal in a shaft direction.

In each of the first body and the first support, a width may be greater than a thickness. The second terminals may include second bodies having curvatures and second supports extending from one portions of the second bodies in the radial direction, and the second bodies may overlap the first terminals in the shaft direction.

The first terminals may include a plurality of connecting terminals, the second terminals may include a neutral terminal and a plurality of phase terminals, and the second body of the neutral terminal may overlap the first support of the first terminal in the shaft direction.

The second support of each of the plurality of phase terminals may be disposed between the first supports of one connecting terminal of the plurality of connecting terminal in the circumferential direction.

The second body of the plurality of phase terminals may overlap the first body of the first terminal in the shaft direction.

The first terminals may include bent portions having curvatures, third bodies extending from both ends of each of the bent portions, and third supports extending from one portions of the third bodies in a radial direction, and at least any one of the third body, the bent portion, and the third support may overlap the second terminal in a shaft direction.

A width of the bent portion may be greater than a thickness thereof.

In each of the third body and the third support, a width in the radial direction may be smaller than a thickness in a vertical direction.

The bent portion may be disposed to be lower than the third body and the third support.

The first terminals may include a plurality of connecting terminals, and third bodies of the plurality of connecting terminals may not overlap in the shaft direction.

The bent portion of one of the plurality of connecting terminals overlaps the third body or the third support of another of the plurality of connecting terminals in the shaft direction.

The second terminals may include fourth bodies having curvatures and fourth supports extending from one portions of the fourth bodies in the radial direction, and the fourth support may overlap the first terminal in the shaft direction.

The second terminals may include a neutral terminal and a plurality of phase terminals, and the fourth support of at least one of the plurality of phase terminals may overlap the first body of the first terminal in the shaft direction.

Advantageous Effects

According to embodiments, an advantageous effect is provided in that assembly is facilitated and thus manufacturing automation is possible in series winding.

According to embodiments, an advantageous effect is provided in that insulation of a coil is easily implemented even in the series winding.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Figure 1:
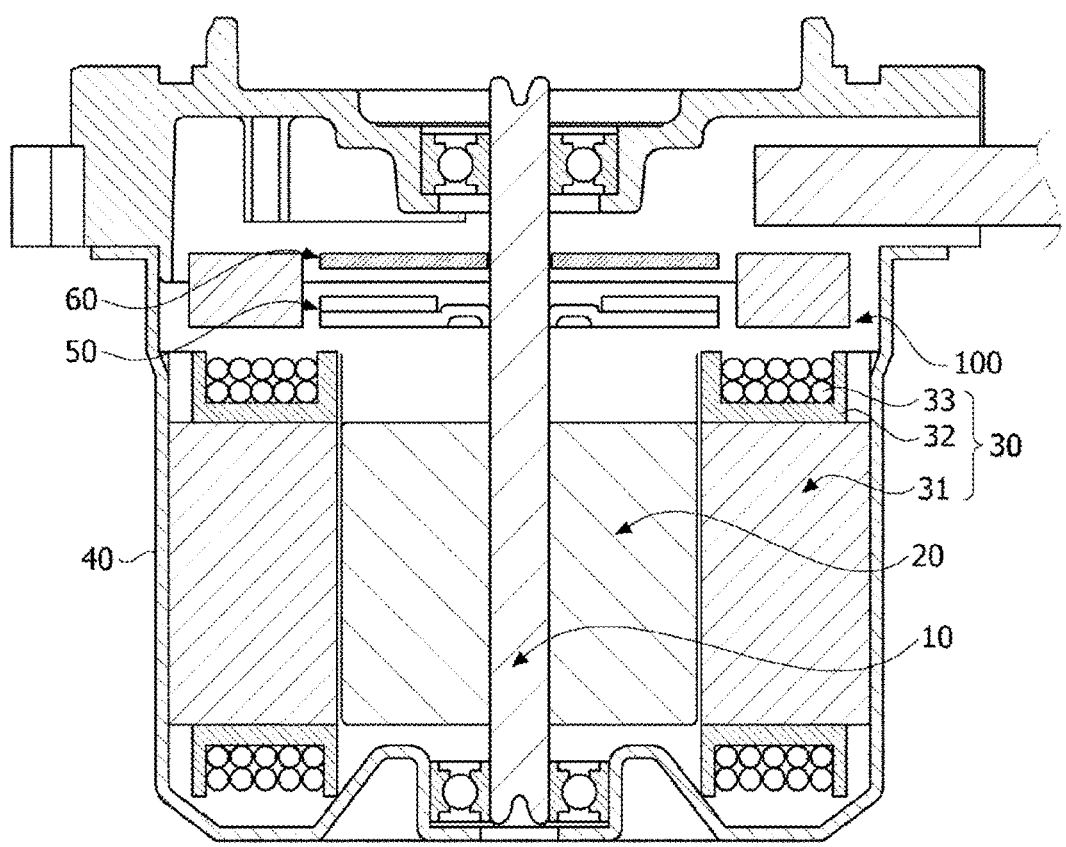
FIG. 1 is a side cross-sectional view illustrating a motor according to an embodiment.

FIG. 1 is a side cross-sectional view illustrating a motor according to an embodiment.

Referring to FIG. 1, the motor according to the embodiment may include a rotating shaft 10, a rotor 20, a stator 30, and a busbar 100.

The rotating shaft 10 may be coupled to the rotor 20. When a current is supplied so that an electrical interaction occurs between the rotor 20 and the stator 30, the rotor 20 is rotated and the rotating shaft 10 is rotated in conjunction with the rotation of the rotor 20. The rotating shaft 10 may be connected to a steering shaft of a vehicle to transmit power to the steering shaft.

The rotor 20 is rotated due to the electrical interaction with the stator 30.

The rotor 20 may include a rotor core and magnets. The rotor core may be formed in a form in which a plurality of thin circular steel plates are stacked or a single cylindrical form. A hole coupled to the rotating shaft 10 may be disposed at a central portion of the rotor core. The magnets may be disposed on an outer circumferential surface or an inner portion of the rotor core.

The stator 30 may include a stator core 31, an insulator 32, and coils 33. The insulator 32 is installed on the stator core 31. The coil 33 is wound around the insulator 32. An electrical interaction occurs between the coil 33 and the rotor 20.

The rotor 20 and the stator 30 may be accommodated in a housing 40.

A sensing magnet 50 is coupled to the rotating shaft 10 to operate in conjunction with the rotor 20. The sensing magnet 50 is a device for detecting a position of the rotor 20.

A sensor configured to detect a magnetic force of the sensing magnet 50 may be disposed on a circuit board 60. In this case, the sensor may be a Hall integrated circuit (IC). The sensor detects changes in an N-pole and an S-pole of the sensing magnet 50 to generate a sensing signal.

The busbar 100 is disposed above the stator 30.

Figure 2:
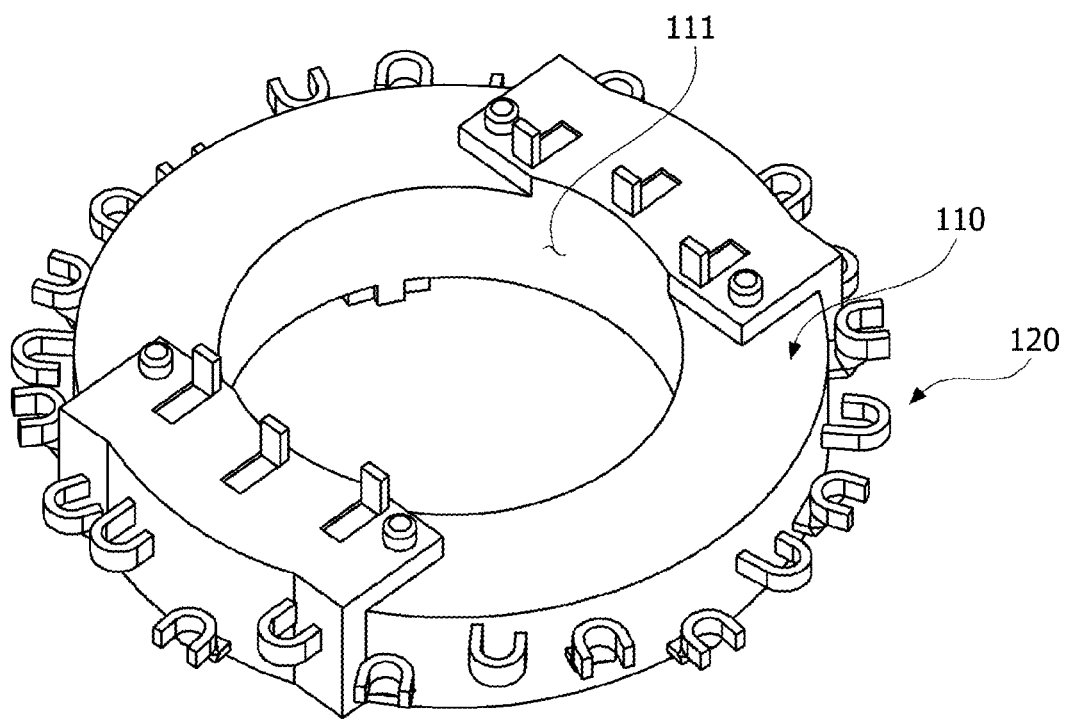
FIG. 2 is a view illustrating a busbar of a motor according to a first embodiment.

FIG. 2 is a view illustrating a busbar of a motor according to a first embodiment.

Referring to FIGS. 1 and 2, a busbar 100 may include terminals 120 disposed in a body 110 having an annular shape.

The busbar 100 includes the body 110 and the terminals 120. The body 110 may be a mold product formed through an injection molding process.

The body 110 includes a hole 111 at a central portion thereof. The terminals 120 may be disposed in the body 110, and some end portions of the terminals 120 may be disposed to be exposed from the body 110. An entirety of the body 110 may have a annular shape. The terminals 120 may include a phase terminal and a neutral terminal.

Figure 3:
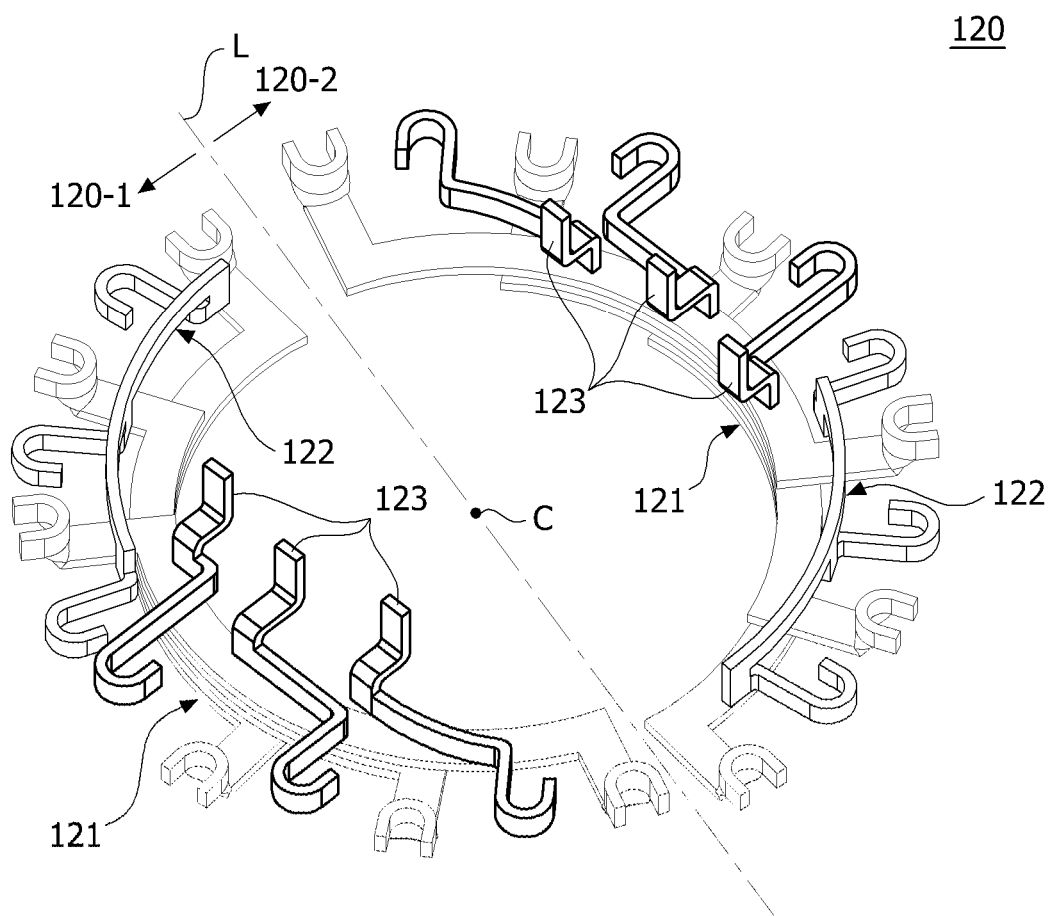
FIG. 3 is a view illustrating a terminal.

FIG. 3 is a view illustrating the terminal.

Referring to FIG. 3, the terminals 120 may be divided into a first group 120-1 and a second group 120-2. The first group 120-1 may be electrically divided from the second group 120-2. Each of the first group 120-1 and the second group 120-2 may include first terminals 121 and second terminals 122 and 123. The first terminal 121 is the terminal 120 connecting the coils 33, and the second terminals 122 and 123 are a neutral terminal 122 and a phase terminal 123, respectively. The first group 120-1 and the second group 120-2 may be disposed to be spatially divided by a reference line L passing through a center C of the busbar 100.

Figure 4:
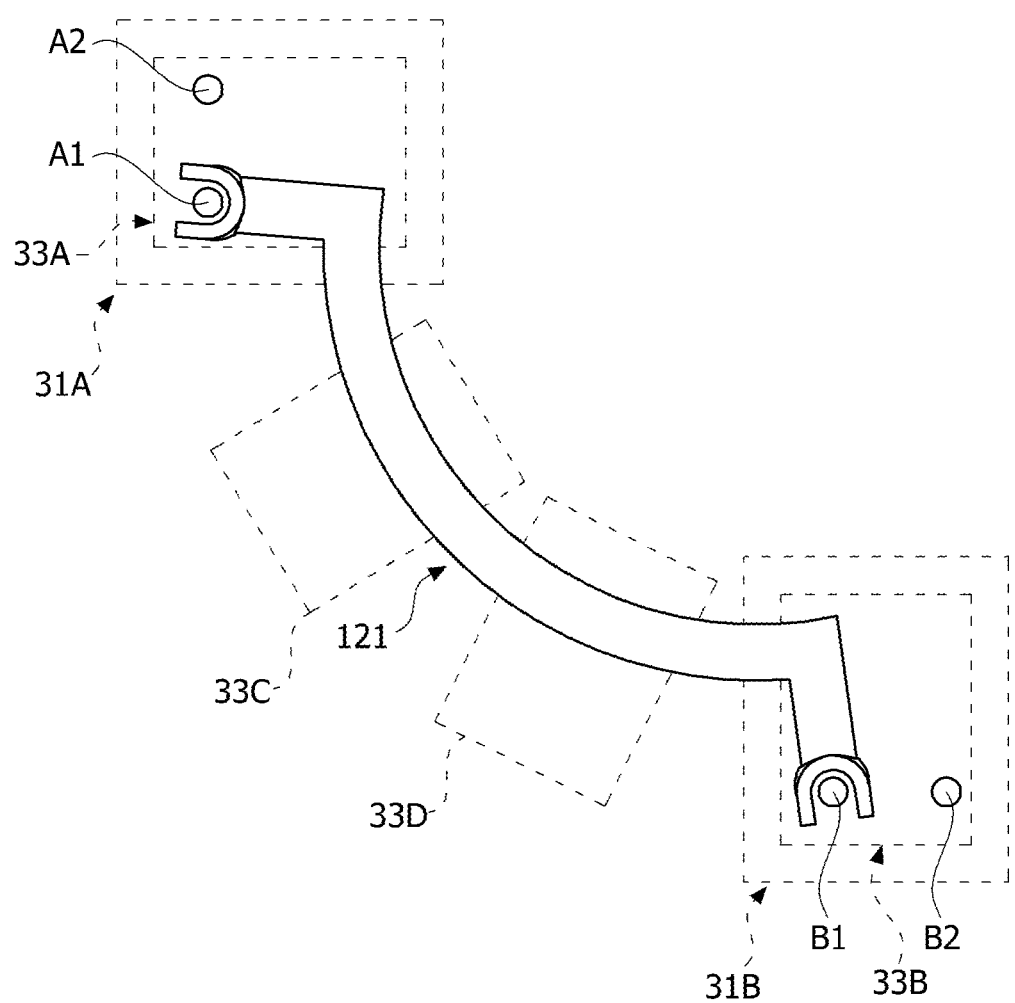
FIG. 4 is a view illustrating a first terminal illustrated in FIG. 3.

FIG. 4 is a view illustrating the first terminal illustrated in FIG. 3.

Referring to FIG. 4, a stator core 31 may include a first unit stator core 31A and a second unit stator core 31B. The coils 33 may include a first unit coil 33A and a second unit coil 33B. The first unit coil 33A is wound around the first unit stator core 31A. The second unit coil 33B is wound around the second unit stator core 31B.

The first unit coil 33A is an independent coil which is not connected to the second unit coil 33B. The first unit coil 33A includes a first end A1 and a second end A2. When the first unit coil 33A is wound, any one of the first end A1 and the second end A2 may be a starting end of the first unit coil 33A, and the remaining one thereof may be a finishing end thereof. The second unit coil 33B includes a third end B1 and a fourth end B2. Any one of the third end B1 and the fourth end B2 may be a starting end of the second unit coil 33B, and the remaining one thereof may be a finishing end thereof.

The first terminal 121 is a connecting terminal and connects one end of the first unit coil 33A and one end of the second unit coil 33B. In this case, the term "one end" denotes an end among the first end A1, the second end A2, the third end B1, and the fourth end B2 connected to the first terminal 121. For example, in FIG. 4, one ends may be the first end A1 and the third end B1.

The second terminals 122 and 123 connect the other end of first unit coil 33A and the other end of the second unit coil 33B. In this case, the term "the other end" denotes an end among the first end A1, the second end A2, the third end B1, and the fourth end connected to the second terminals 122 and 123. For example, in FIG. 4, the other ends may be the second end A2 and the fourth end B2. In addition, when the second end A2 is connected to the phase terminal 123, the fourth end B2 may be connected to the neutral terminal 122. Alternatively, when the second end A2 is connected to the neutral terminal 122, the fourth end B2 may be connected to the phase terminal 123.

The first unit stator core 31A and the second unit stator core 31B are disposed to be spaced apart from each other in a circumferential direction. Two unit coils 33C and 33D may be disposed between the first unit coil 33A and the second unit coil 33B in the circumferential direction.

Figure 5:
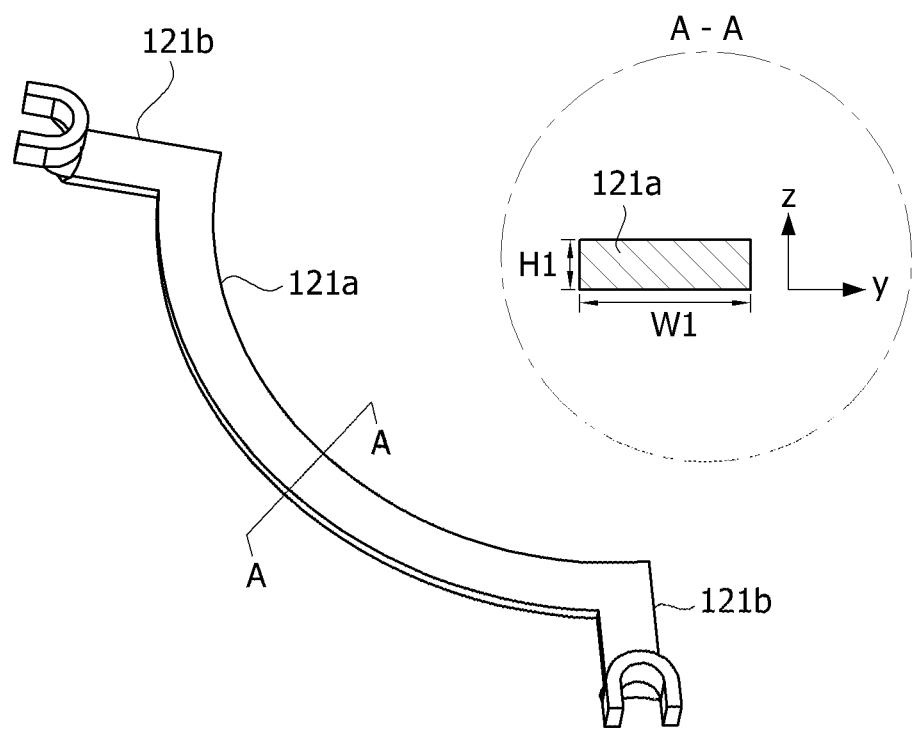
FIG. 5 is a cross-sectional view illustrating the first terminal illustrated in FIG. 3.

FIG. 5 is a cross-sectional view illustrating the first terminal illustrated in FIG. 3. Hereinafter, in the drawings, z denotes a shaft direction of the motor and y denotes a radial direction of the motor.

Referring to FIG. 5, the first terminal 121 includes a first body 121a and a first support 121b. The first body 121a has a curvature. The first support 121b extends from any one portion of the first body 121a in the radial direction. In a cross section of the first body 121a, a width W1 is greater than a thickness H1. The width W1 is based on the radial direction, and the thickness H1 is based on the shaft direction.

Figure 6:
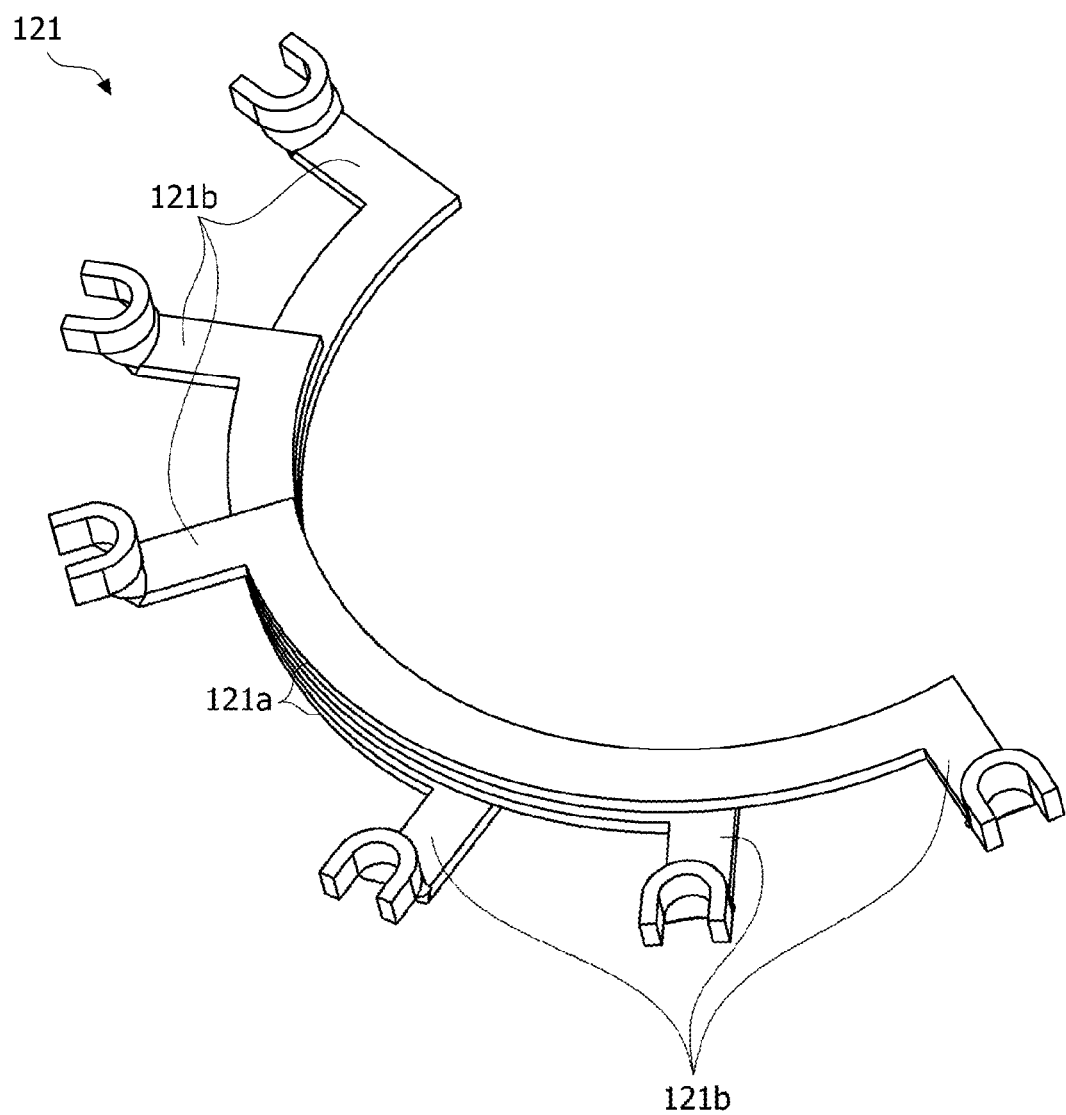
FIG. 6 is a view illustrating a plurality of first terminals.
Figure 7:
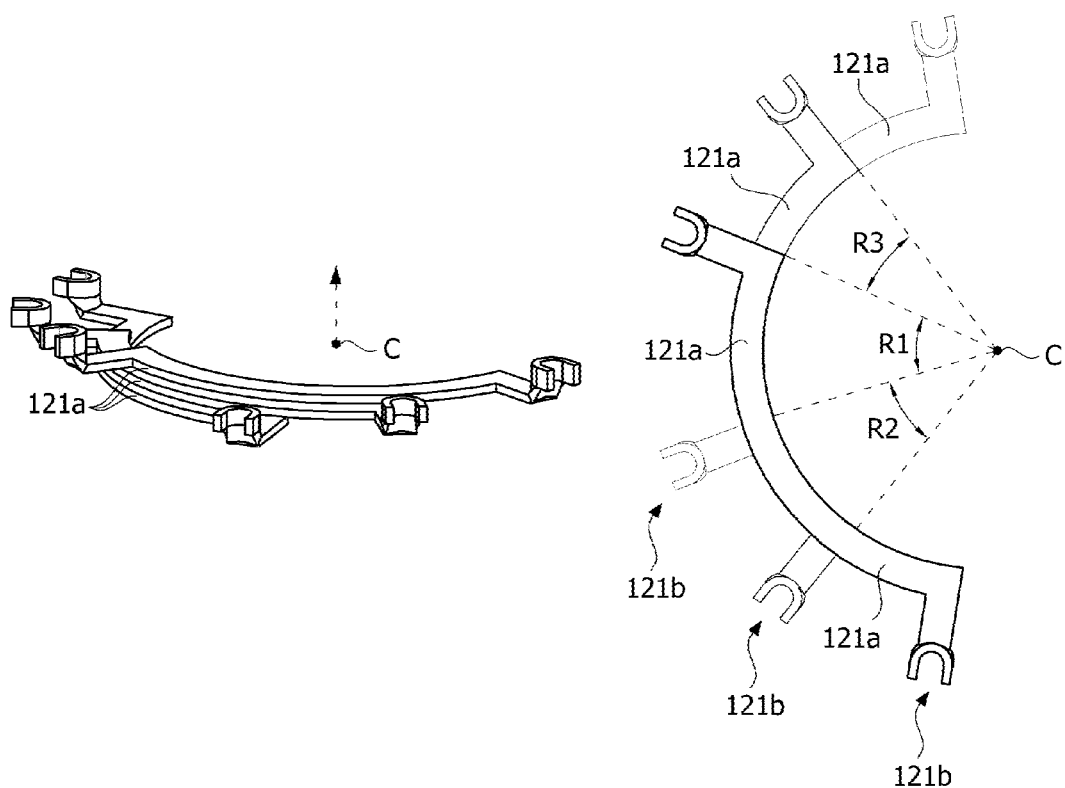
FIG. 7 is a view illustrating the plurality of first terminals which overlap in a shaft direction.

FIG. 6 is a view illustrating the plurality of first terminals, and FIG. 7 is a view illustrating the plurality of first terminals which overlap in a shaft direction.

Referring to FIG. 6, the first terminal 121 may be provided as the plurality of first terminals 121. For example, three first terminals 121 may be disposed. One regions of the first bodies 121a of three first terminals 121 may overlap in the shaft direction. Three first terminals 121 may be disposed to be shifted by angles R1, R2, and R3 in the circumferential direction so that at least one portions of the first bodies 121a overlap in the shaft direction.

Figure 8:
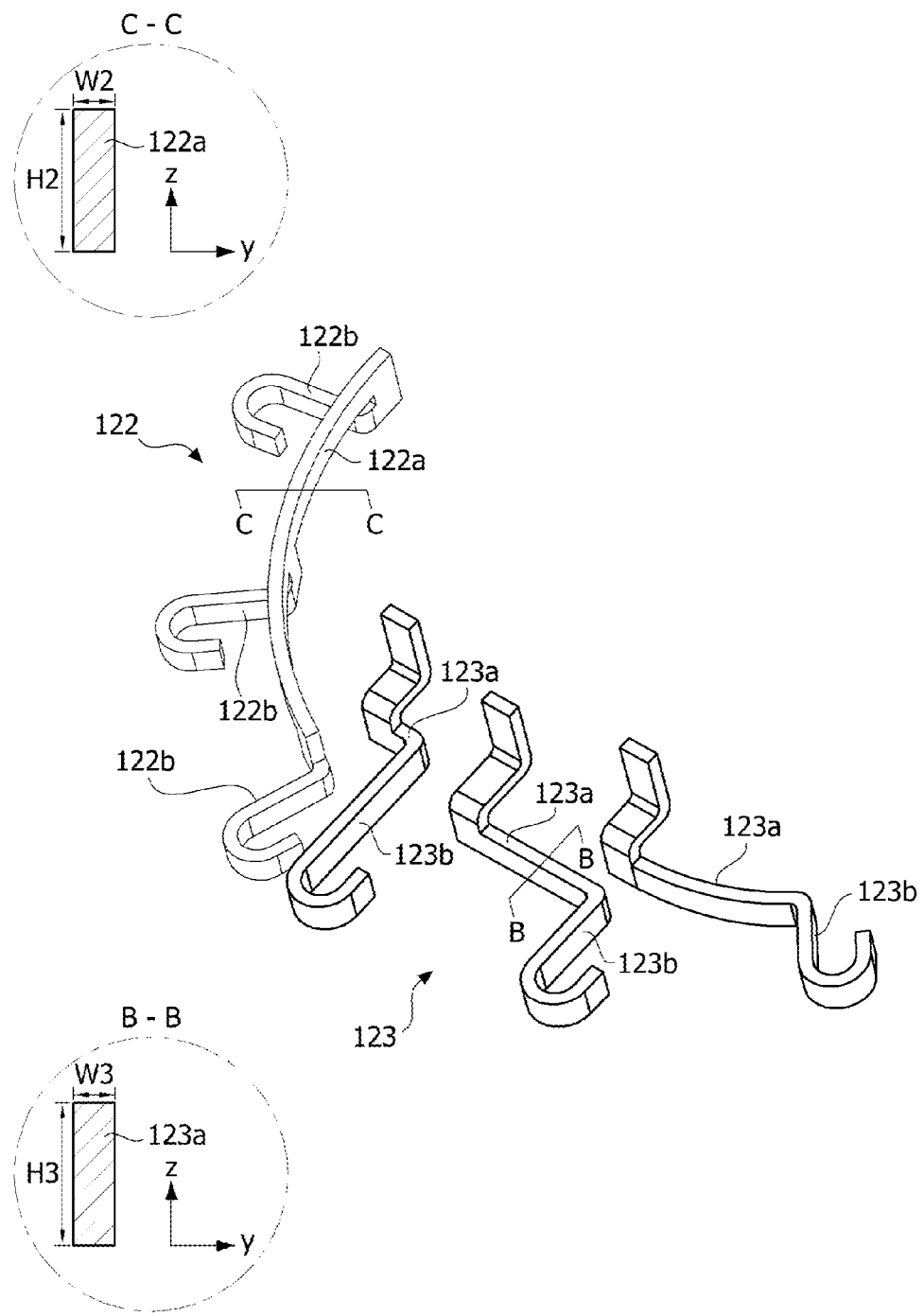
FIG. 8 is a view illustrating a second terminal.

FIG. 8 is a view illustrating the second terminal.

Referring to FIG. 8, the second terminals 122 and 123 include second bodies 122a and 123a and second supports 122b and 123b. The second bodies 122a and 123a have curvatures. The second supports 122b and 123b extend from one portions of the second bodies 122a and 123a in the radial direction. In cross sections of the second bodies 122a and 123a, widths W2 and W3 are smaller than thicknesses H2 and H3, respectively. The widths W2 and W3 are based on the radial direction, and the thicknesses H2 and H3 are based on the shaft direction.

Figure 9:
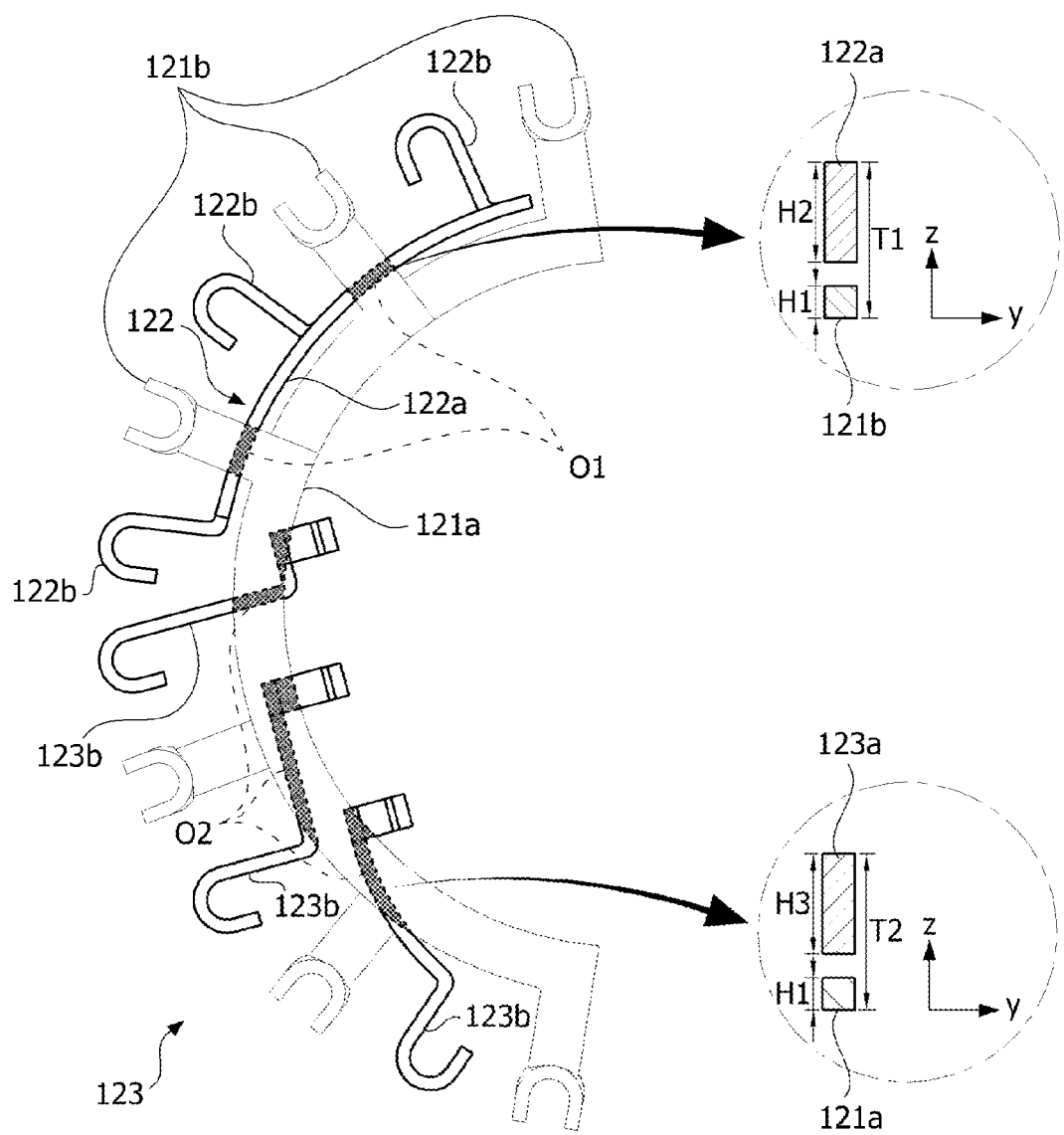
FIG. 9 is a view illustrating an overlap region of the first terminal and the second terminal.

FIG. 9 is a view illustrating an overlap region of the first terminal and the second terminal.

Referring to FIG. 9, the second bodies 122a and 123a of the second terminals 122 and 123 overlap the first terminal 121 in the shaft direction.

As an example, in an overlap region O1, the second body 122a of the neutral terminal 122 overlaps the first support 121b of the first terminal 121 in the shaft direction. The thickness H1 of the first body 121b is smaller than the thickness H2 of the second body 122a of the neutral terminal 122. Since the thickness H1 of the first body 121b is relatively small, a total thickness T1 of the neutral terminal 122 and the first terminal 121 may be reduced.

As an example, in an overlap region O2, the second body 123a of the phase terminal 123 overlaps the first body 121a of the first terminal 121 in the shaft direction. The thickness H1 of the first body 121a is smaller than the thickness H3 of the second body 123a of the phase terminal 123. Since the thickness H1 of the first body 121a is relatively small, a total thickness T2 of the phase terminal 123 and the first terminal 121 may be reduced.

The first support 121b is provided as a plurality of the first supports 121b, the second support 122b is provided as a plurality of second supports 122b, and the second support 123b is provided as a plurality of second supports 123b. The second supports 122b and 123b may be disposed between the first supports 121b.

Figure 10:
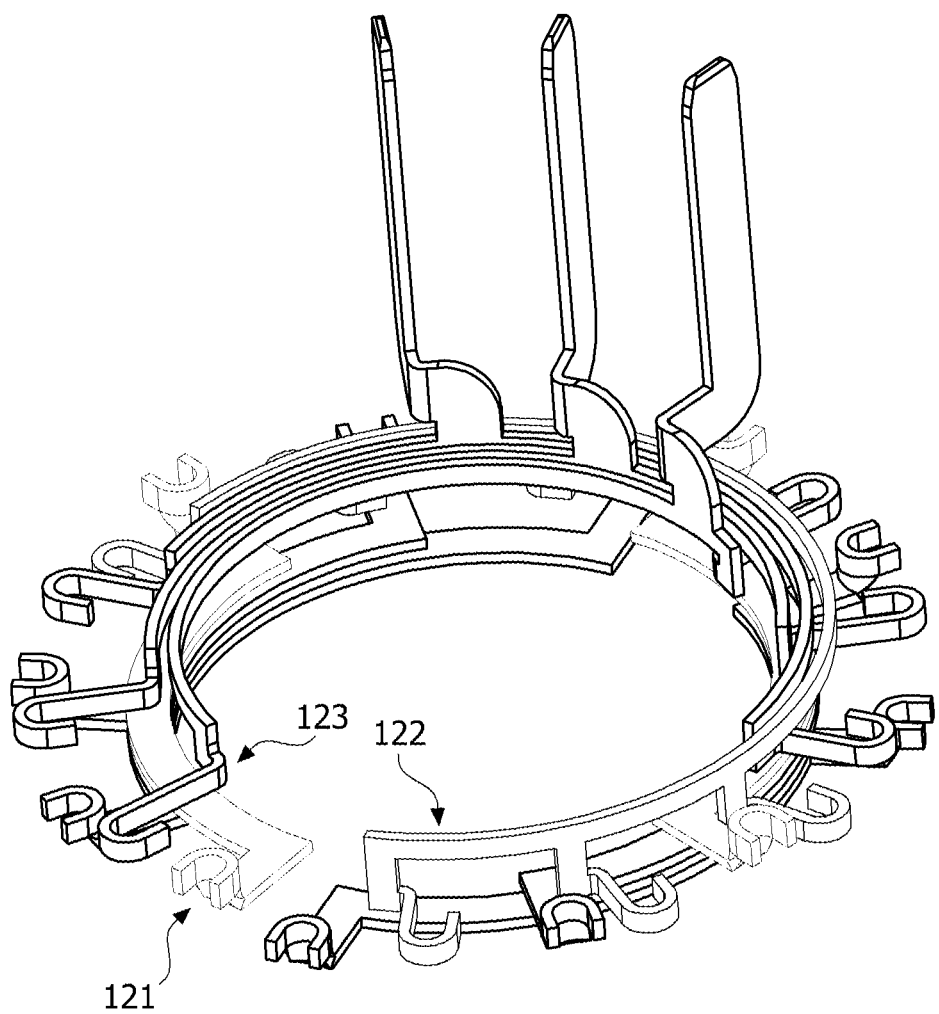
FIG. 10 is a view illustrating a modified example of the second terminal.

FIG. 10 is a view illustrating a modified example of the second terminal.

Referring to FIG. 10, although the second terminals 122 and 123 may include the plurality of phase terminals 123 and the neutral terminal 122, the second terminals 122 and 123 may be electrically connected as one group.

Figure 11:
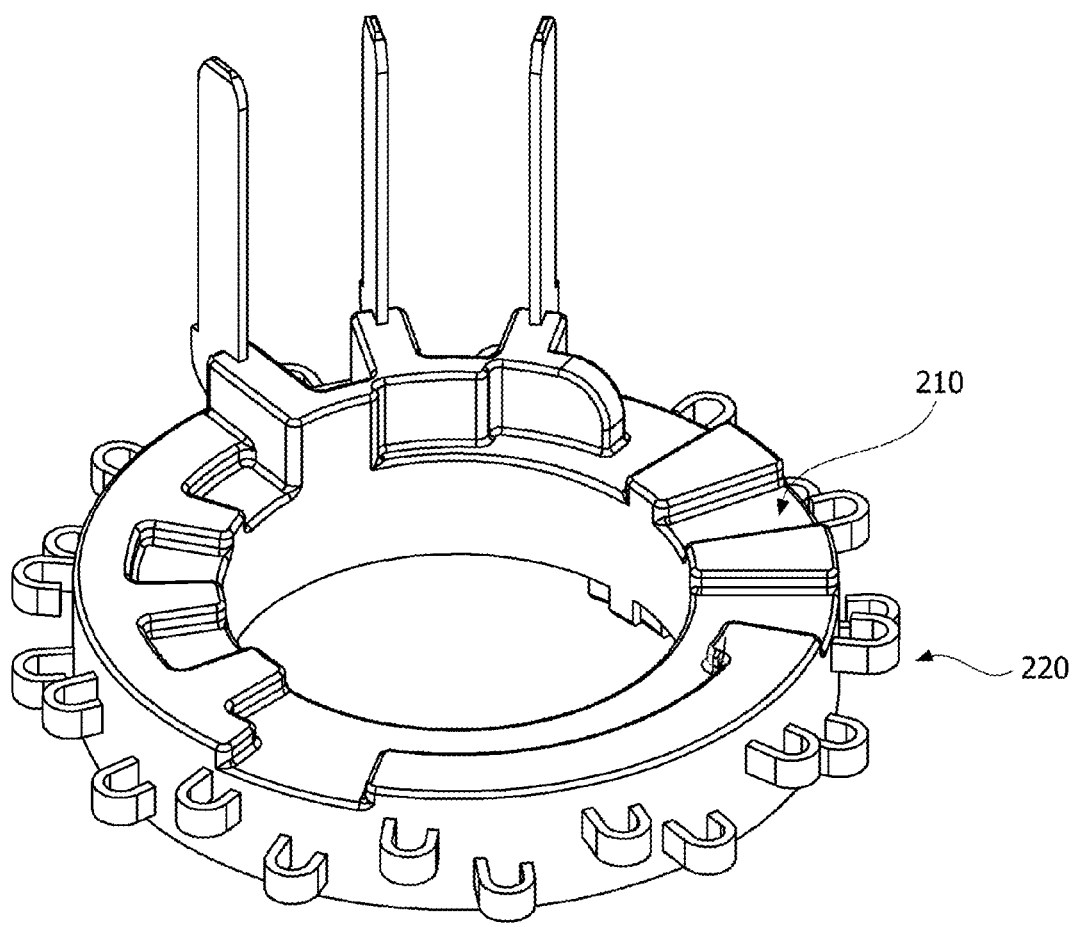
FIG. 11 is a view illustrating a busbar of a motor according to a second embodiment.

FIG. 11 is a view illustrating a busbar of a motor according to a second embodiment.

Referring to FIG. 11, a busbar 200 may include terminals 220 disposed in a body 210 having an annular shape.

Figure 12:
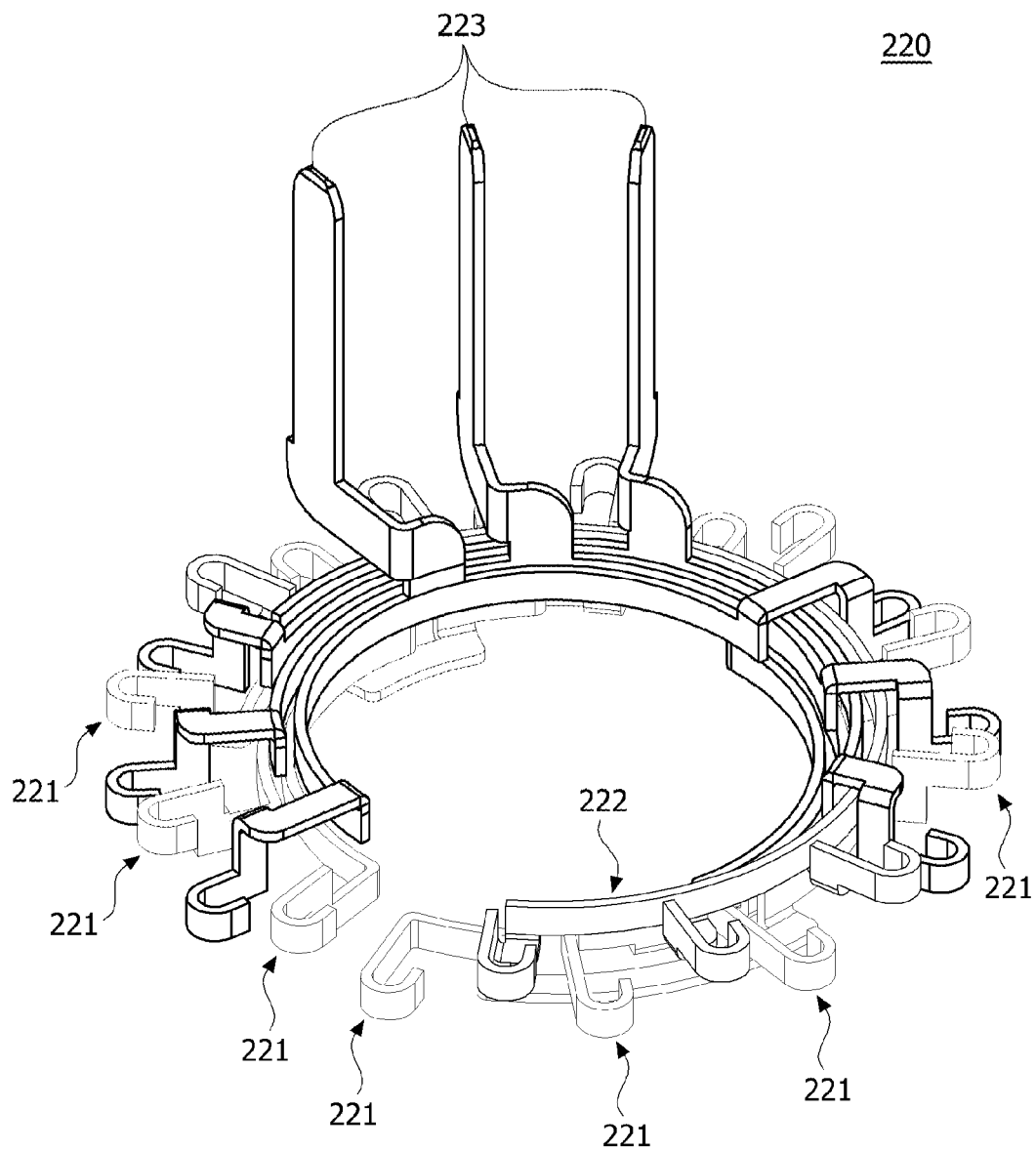
FIG. 12 is a view illustrating a terminal illustrated in FIG. 11.

FIG. 12 is a view illustrating the terminal illustrated in FIG. 11.

Referring to FIG. 12, the terminals 220 may include a first terminal 221 and second terminals 222 and 223. The first terminal 221 is a connecting terminal for connecting a coil 33 and another coil 33, and the second terminals 222 and 223 may be a neutral terminal 222 and a phase terminal 223, respectively. The first terminal 221 may be provided as a plurality of first terminals 221, the second terminal 222 may be provided as a plurality of second terminals 222, the second terminal 223 may be provided as a plurality of second terminals 223, and the first terminals 221 and second terminals 222 and 223 may be electrically connected to each other.

Figure 13:
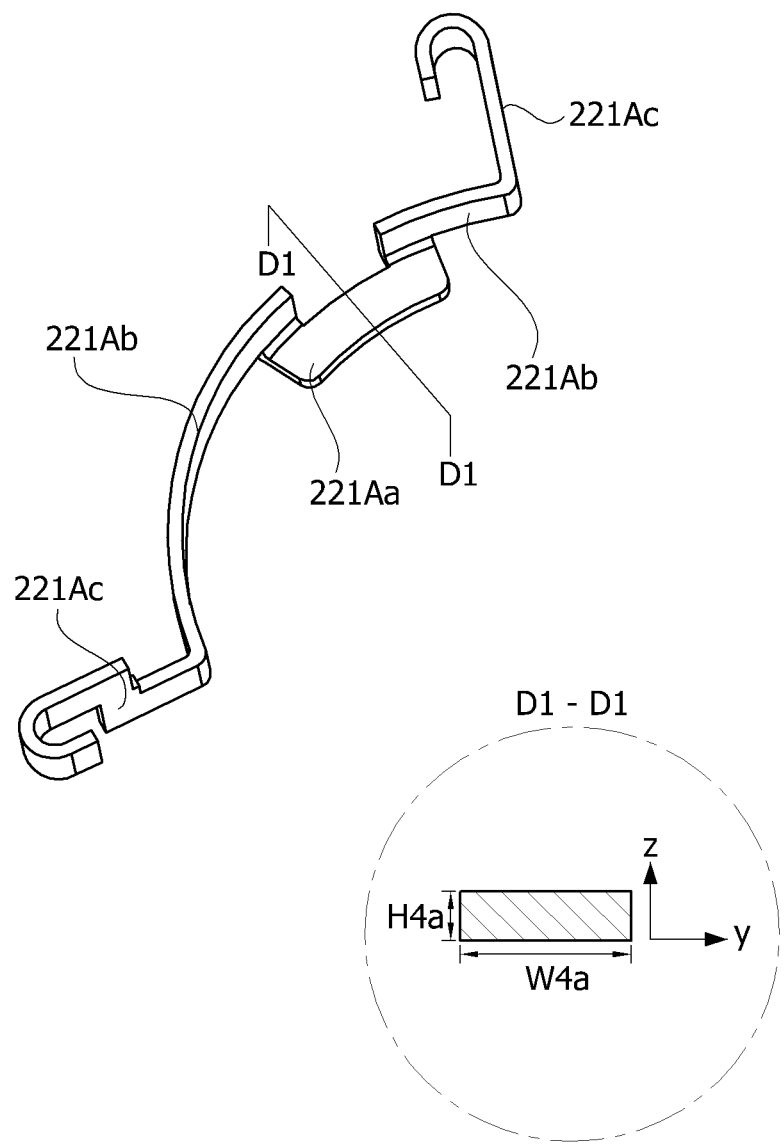
FIG. 13 is a view illustrating a first connecting terminal of a first terminal illustrated in FIG. 12.

FIG. 13 is a view illustrating a first connecting terminal of the first terminal illustrated in FIG. 12.

Figure 14:
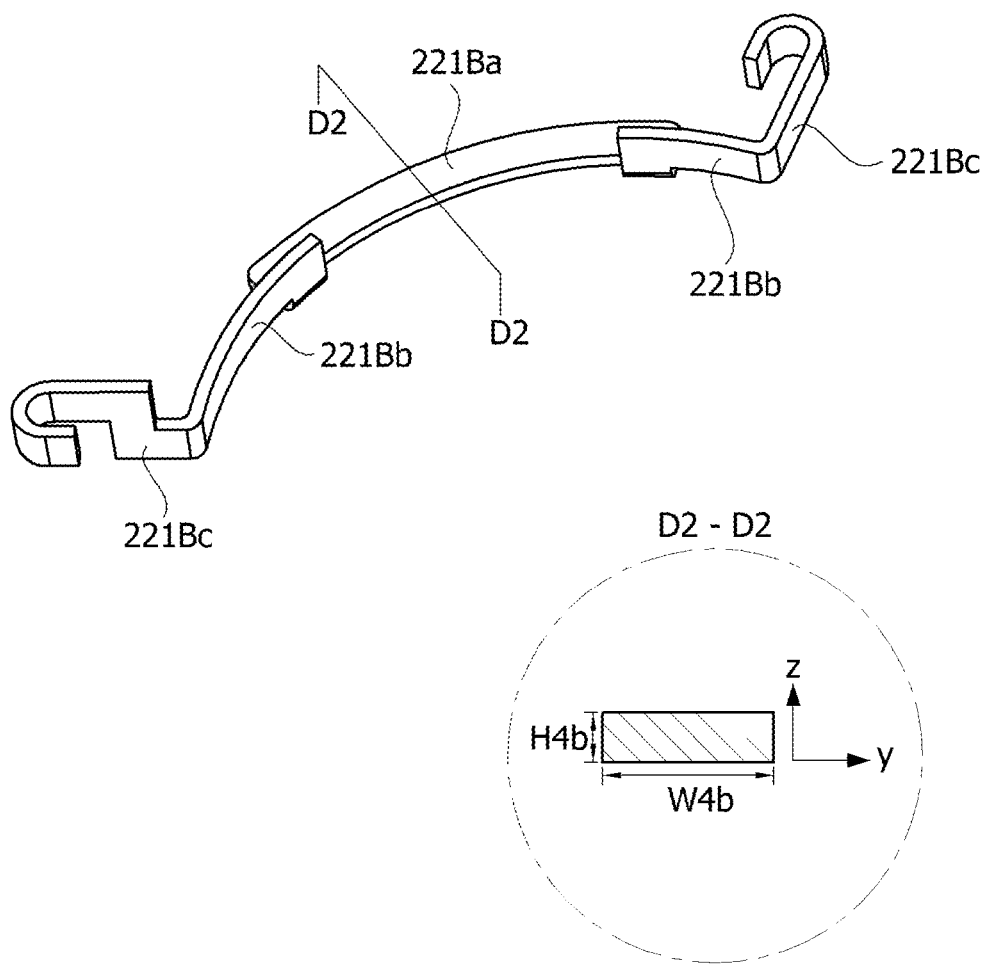
FIG. 14 is a view illustrating a second connecting terminal of the first terminal illustrated in FIG. 12.

FIG. 14 is a view illustrating a second connecting terminal of the first terminal illustrated in FIG. 12.

Referring to FIGS. 13 and 14, the first terminals 221 may include a first connecting terminal 221A and a second connecting terminal 221B.

The first connecting terminal 221A and the second connecting terminal 221B may respectively include bent portions 221Aa and 221Ba, third bodies 221Ab and 221Bb, and third supports 221Ac and 221Bc.

The bent portions 221Aa and 221Ba are bent from the third bodies 221Ab and 221Bb, respectively. The bent portions 221Aa and 221Ba may have curvatures. The third bodies 221Ab and 221Bb extend from both ends of the bent portions 221Aa and 221Ba, respectively. The third supports 221Ac and 221Bc may be disposed to extend from one portions of the third bodies 221Ab and 221Bb in a radial direction, respectively.

In cross sections of the bent portions 221Aa and 221Ba, widths W4a and W4b are greater than thicknesses H4a and H4b, respectively. The widths W4a and W4b are based on the radial direction, and the thicknesses H4a and H4b are based on a shaft direction.

The bent portion 221Aa of the first connecting terminal 221A has a shape extending inward from the third body 221Ab. The bent portion 221Ba of the second connecting terminal 221B has a shape extending outward from the third body 221Bb.

Figure 15:
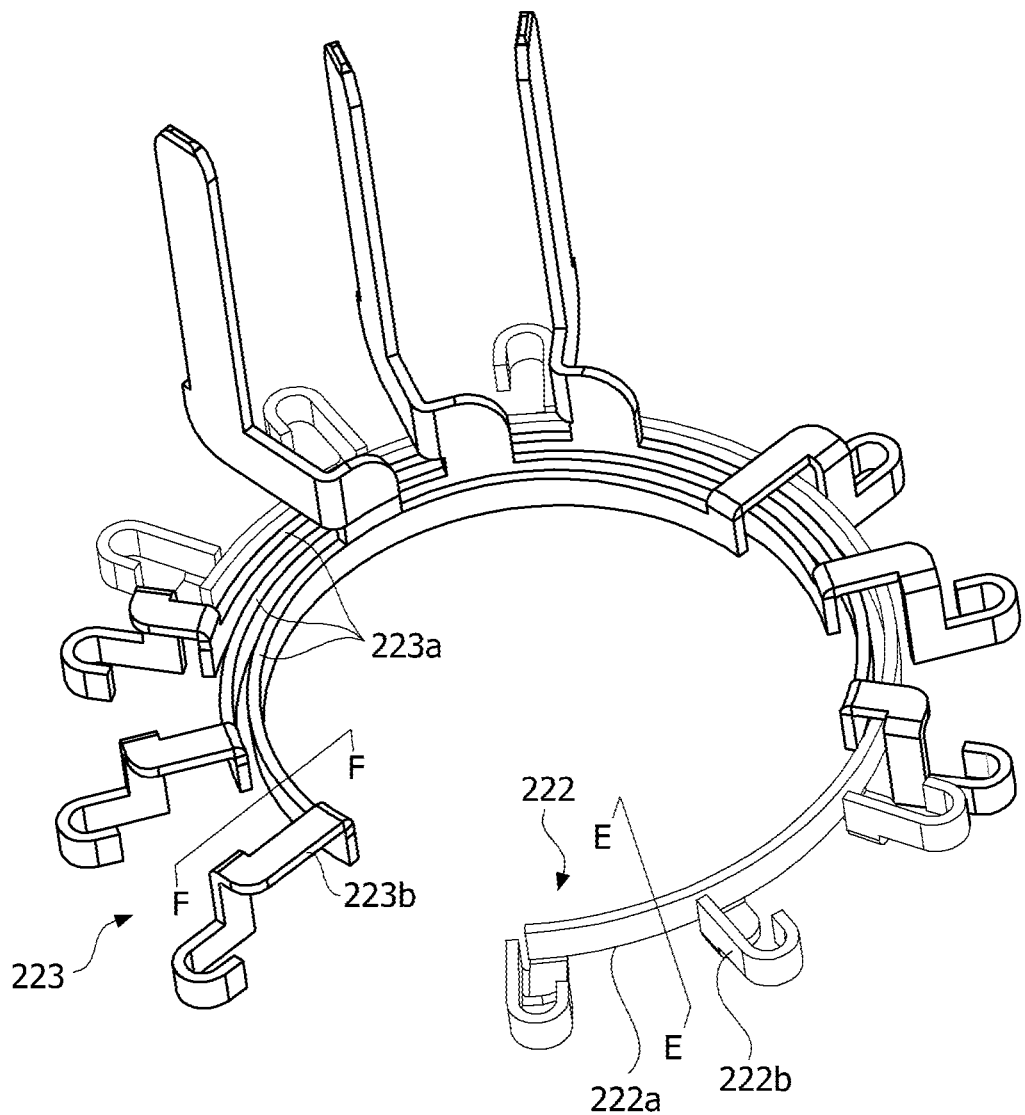
FIG. 15 is a view illustrating a second terminal.
Figure 15:
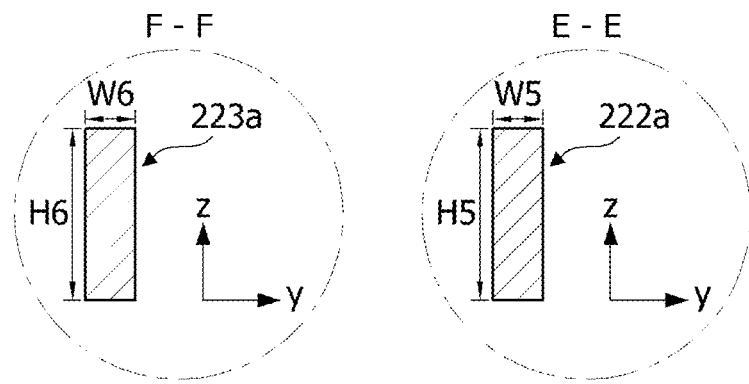

FIG. 15 is a view illustrating the second terminal.

Referring to FIG. 15, the second terminals 222 and 223 respectively include fourth bodies 222a and 223a and fourth supports 222b and 223b. The fourth bodies 222a and 223a have curvatures. The fourth supports 222b and 223b respectively extend from one portions of the fourth bodies 222a and 223a in the radial direction. In cross sections of the fourth bodies 222a and 223a, widths W5 and W6 are smaller than thicknesses H5 and H6, respectively. The widths W5 and W6 are based on the radial direction, and the thicknesses H5 and H6 are based on the shaft direction.

Figure 16:
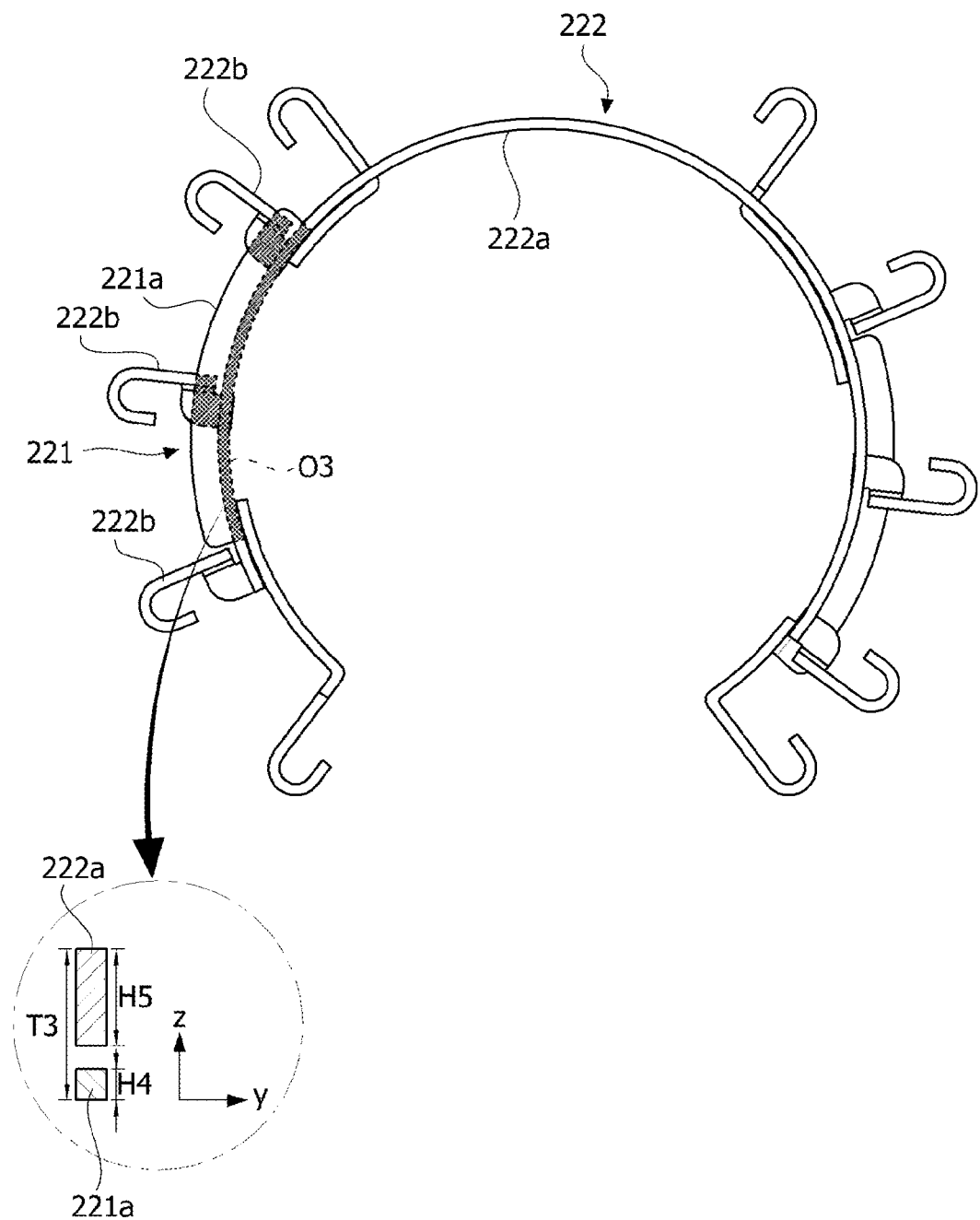
FIG. 16 is a view illustrating an overlap region of the first terminal and the second terminal (neutral terminal).

FIG. 16 is a view illustrating an overlap region of the first terminal and the second terminal (neutral terminal).

The second terminals 222 and 223 overlap a bent portion 221a of the first terminal 221 in the shaft direction.

Referring to FIG. 16, as an example, in an overlap region O3, the neutral terminal 222 overlaps the bent portion 221a in the shaft direction. A thickness H4 of the bent portion 221a is smaller than a thickness H5 of the neutral terminal 222. Since the thickness H4 of the bent portion 221a is relatively small, a total thickness T3 of the neutral terminal 222 and the first terminal 221 may be reduced.

Figure 17:
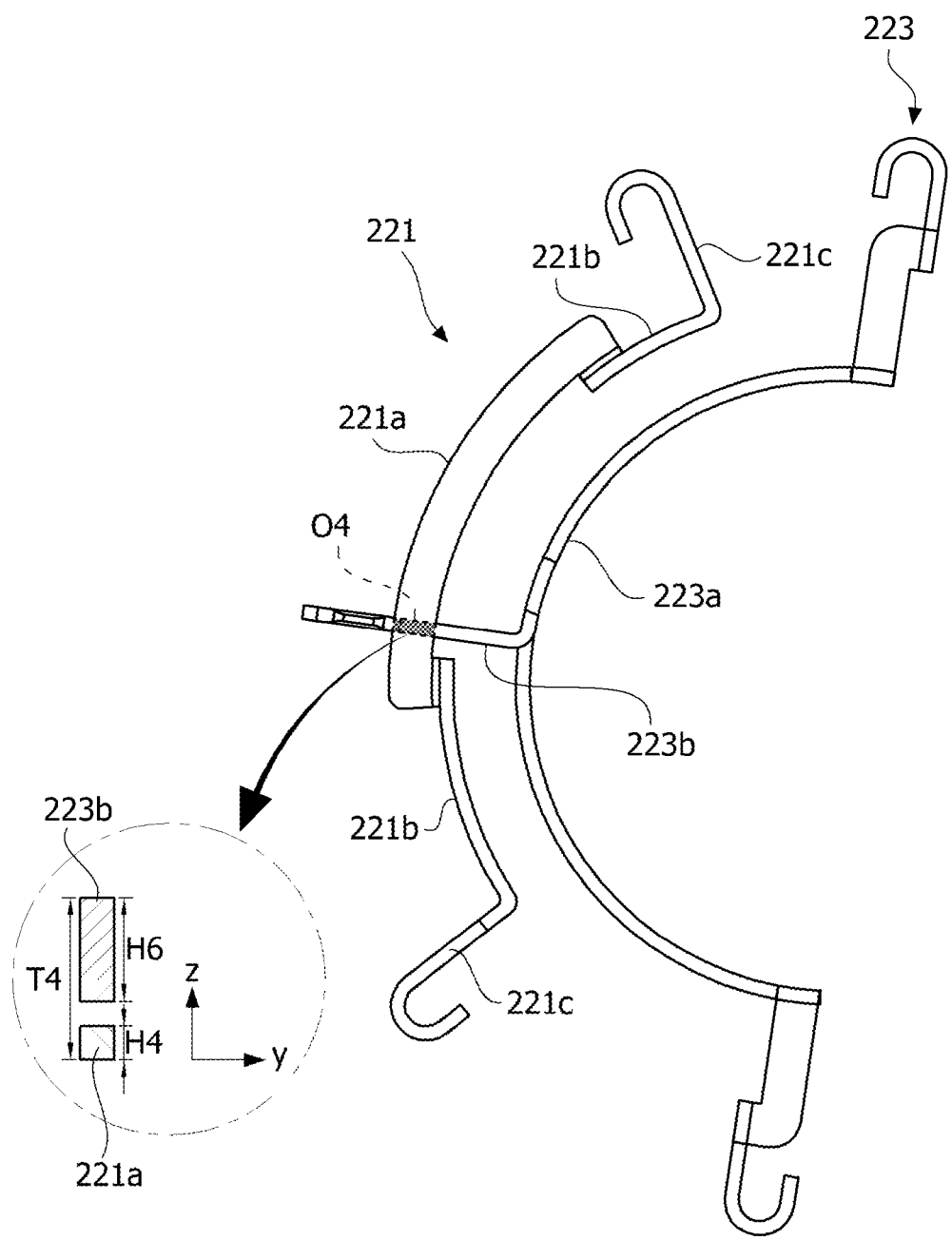
FIG. 17 is a view illustrating an overlap region of the first terminal and the second terminal (phase terminal).

FIG. 17 is a view illustrating an overlap region of the first terminal and the second terminal (phase terminal).

As an example, in an overlap region O4, the fourth support 223b of the phase terminal 223 overlaps the bent portion 221a of the first terminal 221 in the shaft direction. The thickness H4 of the bent portion 221a is smaller than a thickness H6 of the fourth support 223b of the phase terminal 223. Since the thickness H4 of the bent portion 221a is relatively small, a total thickness T4 of the phase terminal 223 and the first terminal 221 may be reduced.

Figure 18:
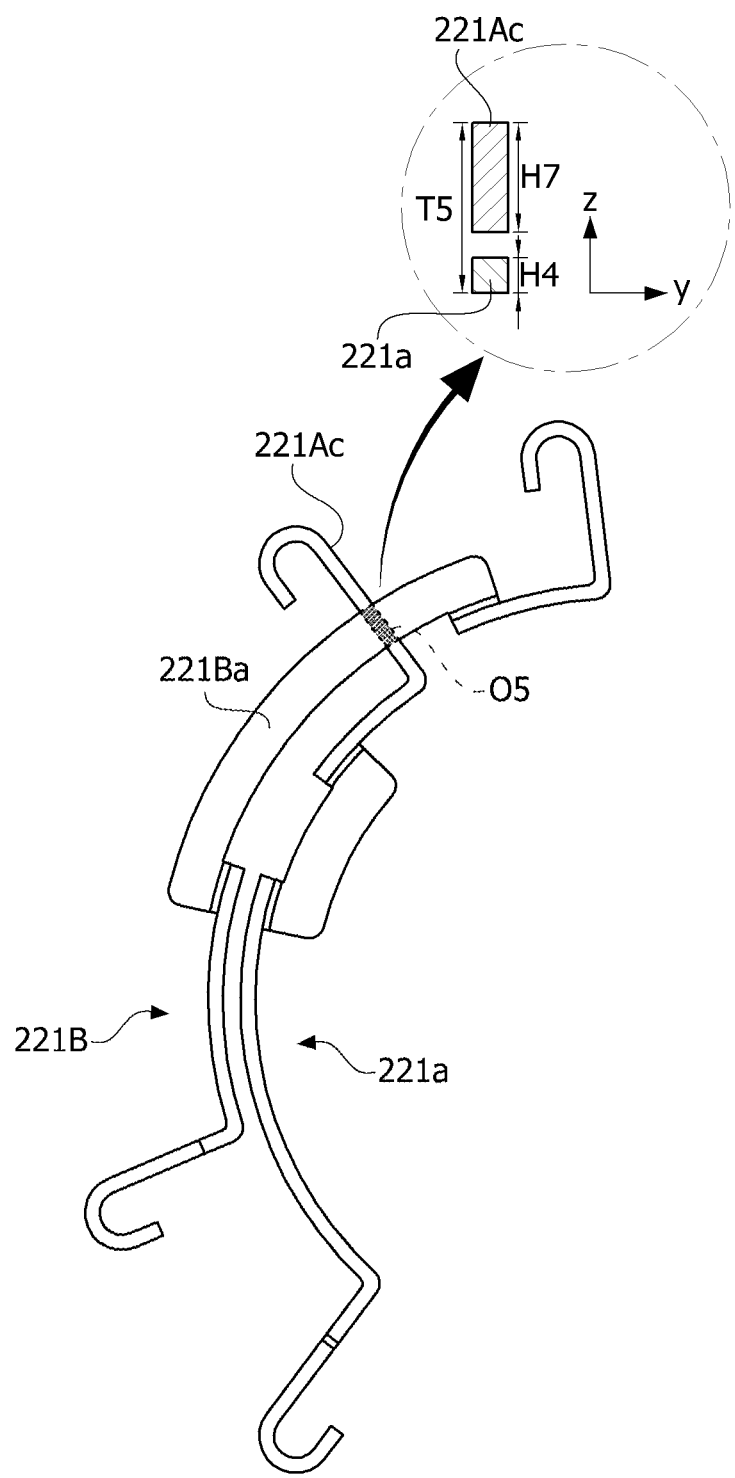
FIG. 18 is a view illustrating an overlap region of the first connecting terminal and the second connecting terminal which are the first terminals.

FIG. 18 is a view illustrating an overlap region of the first connecting terminal and the second connecting terminal which are the first terminals.

Referring to FIG. 18, the first terminals 221 may include a plurality of connecting terminals. The first terminals 221 may include a first connecting terminal 221A and a second connecting terminal 221B. The first connecting terminal 221A and the second connecting terminal 221B overlap in the shaft direction.

As an example, in an overlap region O5, the third support 221Ac of the first connecting terminal 221A overlaps the bent portion 221Ba of the second connecting terminal 221B in the shaft direction. A thickness H4 of the bent portion 221Ba is smaller than a thickness H7 of the third support 221Ac. Since the thickness H4 of the bent portion 221Ba is relatively small, a total thickness T5 of the bent portion 221Ba and the first terminal 221A may be reduced. Meanwhile, the third bodies 221Ab and 221Bb of the plurality of connecting terminals may not overlap in the shaft direction.

The invention claimed is:

1. A motor comprising:
a stator including coils;
a rotor disposed inside the stator; and
a busbar disposed above the stator,
wherein the stator includes a first unit stator core and a second unit stator core,
the coils include a first unit coil and a second unit coil, and
the busbar includes a body and a plurality of terminals connected to the coils of the stator,
   wherein the plurality of terminals include first terminals and second terminals,
      the first unit coil is wound around the first unit stator core,
      the second unit coil is wound around the second unit stator core,
      one end of the first unit coil and one end of the second unit coil are connected to the first terminals, and
      an other end of the first unit coil and an other end of the second unit coil are connected to the second terminals,
   wherein the second terminals include a neutral terminal and a plurality of phase terminals,
   wherein the first terminals and the second terminals share overlapping regions in a shaft direction,
   wherein the first terminals are spaced apart from the second terminals in the shaft direction,
   wherein each first terminal includes a first body unit and a first support,
   wherein the first support extends from any portion of the first body unit,
   wherein the neutral terminal and the phase terminals each includes a second body unit and a second support,
   wherein the second body unit of the neutral terminal overlaps the first supports in the shaft direction, and
   wherein the second body units of the phase terminals overlap the first body units in the shaft direction.

2. The motor of claim 1, wherein the coils comprise two units of coils disposed between the first unit coil and the second unit coil.

3. The motor of claim 2, wherein:
the first body units have curvatures, and the first supports extend from one portion of the first bodies, respectively, in a radial direction.

4. The motor of claim 1, wherein the other end of the first unit coil is connected to the neutral terminal, and the other end of the second unit coil is connected to one of the plurality of phase terminals.

5. The motor of claim 4, wherein:
the first body units have curvatures, and the first supports extend from one portion of the first body units, respectively, in a radial direction.

6. The motor of claim 1, wherein:
the first body units have curvatures, and the first supports extend from one portion of the first body units, respectively, in a radial direction.

7. A motor comprising:
a stator including coils;
a rotor disposed inside the stator; and
a busbar disposed above the stator,
wherein the stator includes a first unit stator core and a second unit stator core,
the coils include a first unit coil and a second unit coil, and
the busbar includes a body and a plurality of terminals connected to the coils of the stator,
   wherein the plurality of terminals include first terminals and second terminals,
      the first unit coil is wound around the first unit stator core,
      the second unit coil is wound around the second unit stator core,
      one end of the first unit coil and one end of the second unit coil are connected to the first terminals,
      an other end of the first unit coil and an other end of the second unit coil are connected to the second terminals,
      the other end of the first unit coil is connected to a neutral terminal; and
      the other end of the second unit coil is connected to one of a plurality of phase terminals, and
   wherein the first terminals and the second terminals share overlapping regions in a shaft direction,
   wherein the first terminals are spaced apart from the second terminals in the shaft direction,
   wherein each first terminal includes a first body unit and a first support,
   wherein the first support extends from any portion of the first body unit,
   wherein the neutral terminal and the phase terminals each includes a second body unit and a second support,
   wherein the second body unit of the neutral terminal overlaps the first supports in the shaft direction, and
   wherein the second body units of the phase terminals overlap the first body units in the shaft direction.

8. A motor comprising:
a stator including coils;
a rotor disposed inside the stator; and
a busbar disposed above the stator,
wherein the stator includes a first unit stator core and a second unit stator core,
the coils include a first unit coil and a second unit coil, and
the busbar includes a body and a plurality of terminals connected to the coils of the stator,
   wherein the plurality of terminals include first terminals and second terminals,
      the first unit coil is wound around the first unit stator core,
      the second unit coil is wound around the second unit stator core,
      one end of the first unit coil and one end of the second unit coil are connected to the first terminals,
      an other end of the first unit coil and an other end of the second unit coil are connected to the second terminals,
   wherein the second terminals include two groups each including a neutral terminal and a plurality of phase terminals, and
   wherein the two groups are electrically divided, and
   wherein the first terminals and the second terminals share overlapping regions in a shaft direction,
   wherein the first terminals are spaced apart from the second terminals in the shaft direction,
   wherein each first terminal includes a first body unit and a first support,
   wherein the first support extends from any portion of the first body unit,
   wherein the neutral terminal and the phase terminals each includes a second body unit and a second support, wherein the second body unit of the neutral terminal overlaps the first supports in the shaft direction, and wherein the second body units of the phase terminals overlap the first body units in the shaft direction.

9. A motor comprising;

a stator including coils;

a rotor disposed inside the stator; and a busbar disposed above the stator, wherein the busbar includes a body and a plurality of terminals connected to the coils, and the coils include a first unit coil and a second unit coil, wherein the plurality of terminals include first terminals and second terminals, wherein the first terminals and the second terminals share overlapping regions in a shaft direction, and wherein the first terminals are spaced apart from the second terminals in the shaft direction, a thickness of the first terminal is smaller than a thickness of the second terminal in the overlapping regions, one end of the first unit coil and one end of the second unit coil are connected to the first terminals, and an other end of the first unit coil and an other end of the second unit coil are connected to the second terminals, the first terminals include first connecting terminals and second connecting terminals, wherein each of the first connecting terminals and the second connecting terminals includes bent portions having curvatures, first body units extending from both ends of each of the bent portions, and first supports extending from one portion of the first body units, respectively, in a radial direction; and wherein the bent portions of the first connecting terminals each has a shape extending inward from the first body units of the first connecting terminals, wherein the bent portions of the second connecting terminals each has a shape extending outward from the first body units of the second connecting terminals, wherein the second terminals include a neutral terminal and a plurality of phase terminals, wherein the bent portions of the first connecting terminals overlap the neutral terminal in the shaft direction, and wherein the bent portions of the second connecting terminals overlap the first supports of the first connecting terminals, the neutral terminal, and the phase terminals in the shaft direction.

10. The motor of claim 9, wherein:

a width of the bent portions in the radial direction is greater than a thickness of the bent portions; and a width in the radial direction is smaller than a thickness in a vertical direction in each of the first body units and the first supports.

11. The motor of claim 10, wherein the bent portions are disposed to be lower than the first body units and the first supports.

12. The motor of claim 9, wherein:

adjacent body units of the first body units of the plurality of connecting terminals do not overlap in the shaft direction.

13. The motor of claim 12, wherein the bent portions of one of the plurality of connecting terminals overlap the first body units or the first supports of another connecting terminal of the plurality of connecting terminals in the shaft direction.

14. The motor of claim 9, wherein:

the second terminals include second body units having curvatures and second supports extending from one portion of the second body units, respectively, in the radial direction; and the second supports overlap the bent portions of the first terminal in the shaft direction.

15. The motor of claim 14, wherein:

the second supports of at least one of the plurality of phase terminals overlap the first body units of the first terminal in the shaft direction.

16. The motor of claim 9, wherein:

a width of the bent portions in the radial direction is greater than a thickness of the bent portions; and a width in the radial direction is smaller than a thickness in a vertical direction in each of the first body units and the first supports.

17. The motor of claim 16, wherein the bent portions are disposed to be lower than the first body units and the first supports.

* * * * *